United States Patent
Peterson (10) Patent No.: US 6,999,536 B1
(45) Date of Patent: Feb. 14, 2006

(54) SYSTEM FOR PHASE ERROR ESTIMATION FOR A QUADRATURE MODULATOR

(75) Inventor: Maurice W. Peterson, Swisher, IA (US)

(73) Assignee: Rockwell Collins, Cedar Rapids, IA (US)

(*) Notice: Subject to any disclaimer, the term of this patent is extended or adjusted under 35 U.S.C. 154(b) by 859 days.

(21) Appl. No.: 09/838,486

(22) Filed: Apr. 19, 2001

(51) Int. Cl.
*H04B 1/10* (2006.01)
*H04L 1/00* (2006.01)

(52) U.S. Cl. ............................ 375/346; 375/320

(58) Field of Classification Search ............ 375/226, 375/322, 324, 325, 329, 346; 455/67.13
See application file for complete search history.

(56) References Cited

U.S. PATENT DOCUMENTS 5,504,453 A * 4/1996 MacDonald et al. ........ 329/304
6,356,599 B1 * 3/2002 Lee ........................... 375/327

* cited by examiner

*Primary Examiner*—Khai Tran
*Assistant Examiner*—David B. Lugo
(74) *Attorney, Agent, or Firm*—Nathan O. Jensen; Kyle Eppele (57) ABSTRACT

The present invention discloses a system and method of estimating phase error in a waveform sent from an analog transmitter. In a first technique, the ratio of the minimum to maximum envelope may be fit into a curve to determine the phase error of the waveform. In a second technique utilizing the maximum abscissa, the phase error estimate may be obtained utilizing an arctangent of an angle formed by a line from an origin through a point on the waveform at the index where the angle is equal to the phase error. A third technique for estimating phase error may involve determining an angle subtended by a line from an origin to an intersection and the closest axis, where the phase error estimate is twice the angle formed.

17 Claims, 8 Drawing Sheets

FIG. 1

$$R = \begin{array}{|c|c|c|c|c|c|c|} \hline & \text{emx} & \text{emn} & \text{ratio} & \Theta & \text{envMx}(\Theta) & \text{envMn}(\Theta) \\ \hline 0 & 1 & 1 & 1 & 0 & 1 & 1 \\ \hline 1 & 1.009 & 0.991 & 0.983 & 44.5 & 1.009 & 0.991 \\ \hline 2 & 1.017 & 0.982 & 0.966 & 44 & 1.017 & 0.982 \\ \hline 3 & 1.026 & 0.973 & 0.949 & 43.5 & 1.026 & 0.973 \\ \hline 4 & 1.034 & 0.964 & 0.933 & 43 & 1.034 & 0.964 \\ \hline 5 & 1.043 & 0.955 & 0.916 & 42.5 & 1.043 & 0.955 \\ \hline 6 & 1.051 & 0.946 & 0.9 & 42 & 1.051 & 0.946 \\ \hline 7 & 1.059 & 0.937 & 0.885 & 41.5 & 1.059 & 0.937 \\ \hline 8 & 1.067 & 0.928 & 0.869 & 41 & 1.067 & 0.928 \\ \hline 9 & 1.075 & 0.918 & 0.854 & 40.5 & 1.075 & 0.918 \\ \hline 10 & 1.083 & 0.909 & 0.839 & 40 & 1.083 & 0.909 \\ \hline 11 & 1.091 & 0.9 & 0.824 & 39.5 & 1.091 & 0.9 \\ \hline 12 & 1.099 & 0.89 & 0.81 & 39 & 1.099 & 0.89 \\ \hline 13 & 1.107 & 0.88 & 0.795 & 38.5 & 1.107 & 0.88 \\ \hline 14 & 1.114 & 0.871 & 0.781 & 38 & 1.114 & 0.871 \\ \hline 15 & 1.122 & 0.861 & 0.767 & 37.5 & 1.122 & 0.861 \\ \hline 16 & 1.129 & 0.851 & 0.754 & 37 & 1.129 & 0.851 \\ \hline 17 & 1.137 & 0.841 & 0.74 & 36.5 & 1.137 & 0.841 \\ \hline 18 & 1.144 & 0.831 & 0.727 & 36 & 1.144 & 0.831 \\ \hline 19 & 1.151 & 0.821 & 0.713 & 35.5 & 1.151 & 0.821 \\ \hline 20 & 1.158 & 0.811 & 0.7 & 35 & 1.158 & 0.811 \\ \hline \end{array}$$

SYSTEM FOR PHASE ERROR ESTIMATION FOR A QUADRATURE MODULATOR

FIELD OF THE INVENTION

The present invention relates generally to error estimation systems and methods and more specifically to a method and system for estimating phase error inherent in waveforms sent from analog transmitters.

BACKGROUND OF THE INVENTION

Transmitters known to the art are driven by digital circuits at very high sampling rates. With these digital circuits, the inphase and quadrature data may be created digitally and in perfect quadrature. However, the inphase and quadrature data may be distorted when utilized with analog circuits during transmission due to phase, gain, and direct current error inherent in such analog circuits.

A compensation of the phase, gain, and direct current error is necessary for clear reception of the transmitted signal. Another problem with estimating phase errors lies in the variation of the error. Phase error may change and may be altered due to variations over time, temperature, and wider bandwidths.

Consequently, it would be advantageous if a system and method existed that could estimate the phase error in the waveform sent from an analog transmitter. It would also be advantageous if the system and method could continuously monitor the phase error due to variations in phase error.

SUMMARY OF THE INVENTION

Accordingly, the present invention is directed to a novel system and method for continuously estimating the phase error inherent in a waveform sent from an analog transmitter. Alternative approaches may be utilized to estimate the phase error. A first approach involves computing the minimum and maximum envelope values and computing a ratio of the minimum and maximum envelope values. A relationship between the ratio of minimum to maximum envelope value data and phase error may be determined. Other alternative approaches involve utilizing a half angle technique and a maximum abscissa technique for estimating the phase error.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
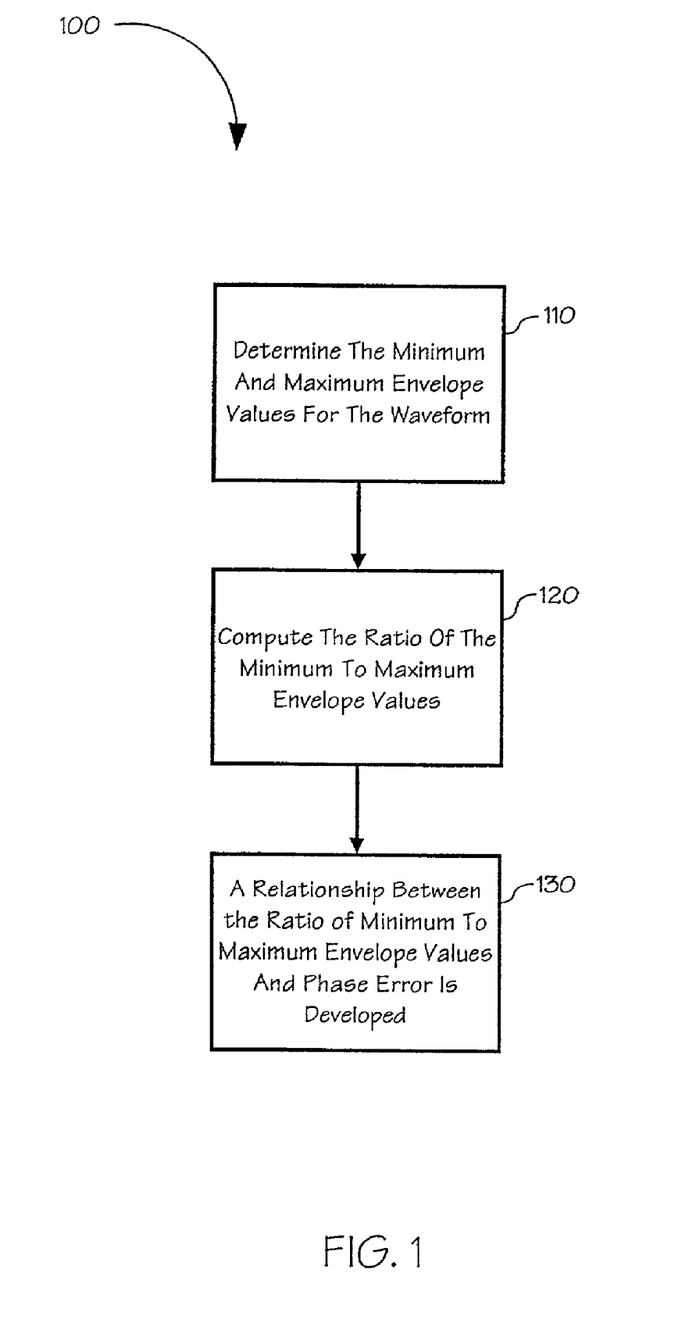
FIG. 1 depicts an embodiment of a flow diagram for estimating phase error in a waveform by the minimum to maximum envelope ratio technique of the present invention.

Referring to FIG. 1, an embodiment of a process 100 of the present invention is shown. The process 100 may begin by continuously determining the minimum and maximum envelope values for the waveform 110. The envelope of a waveform refers to a point-by-point magnitude of the waveform. A ratio of the minimum envelope value and the maximum envelope value may be computed 120. Utilizing the ratio of minimum envelope value to the maximum envelope value, a comparison between the ratio and the phase error 130 may be made. The relationship between the ratio and the phase error can be computed and data may be fit to a straight line or, preferably, a quadratic equation. Fitting the data to a quadratic equation may yield a more accurate estimate of the phase error. An advantage of the process 100 is ability to not require quadrature components. This is advantageous as less computations may be required in the estimation of the phase error.

A simulation of the method of estimating phase error by utilizing the ratio of minimum envelope value to the maximum envelope value may be accomplished utilizing the following exemplary factors.

A number N data points may be created for study:

$$N := 1000$$

$$n := 0 .. N-1$$

An angle increment may be created:

$$\Delta := \frac{360}{N} \cdot \frac{\pi}{180}$$

$$\theta_n := n \cdot \Delta$$

The angle may be converted from radians to degrees by $$\zeta := 180 \cdot \pi^{-1}$$

The semi major and minor ellipse axes and direct current offsets may be:

$a := 1$ $b := 1$ $h := 0$ $k := 0$

The x-axis variables may be:

$x_{mn} := -a + h$ $x_{mx} := a + h$ $\delta_x := 2 \cdot a \cdot N^{-1}$ $x_n := x_{mn} + n \cdot \delta_x$ A number of phase errors up to 20 degrees may be created:

$\phi max := 20$ $n1 := 0 .. \phi max$ $\phi_{n1} := n1 \cdot \zeta^{-1}$

A matrix of waveform coordinates, u and v, may be created with a column of N points for each phase error (the phase error may be inserted in the v channel):

$u_{n,n1} := a \cdot \cos(\theta_n)$ $v_{n,n1} := b \cdot \sin(\theta_n + \phi_{n1})$ The envelope of the coordinates may be computed by:

$$env_{n,n1} := \sqrt{(u_{n,n1})^2 + (v_{n,n1})^2}$$

The maximum envelope value for each phase error may be computed by:

$emx_{n1} := \max(env^{<n1>})$

The minimum envelope value may be computed by:

$emn_{n1} := \min(env^{<n1>})$

The ratio of minimum to maximum envelope values may be determined by:

$$er_{nx_{n1}} := \frac{emn_{n1}}{emx_{n1}}$$

The phase at the maximum envelope value may be calculated by differentiating the expression for the envelope squared with respect to $\Theta$, setting it to zero, and solving for $\Theta$:

$$\Theta_{n1} := \frac{\operatorname{atan}\left(\frac{b^2 \cdot \sin(2 \cdot \phi_{n1})}{a^2 - b^2 \cdot \cos(2 \cdot \phi_{n1})}\right)}{2}$$

Figure 2:
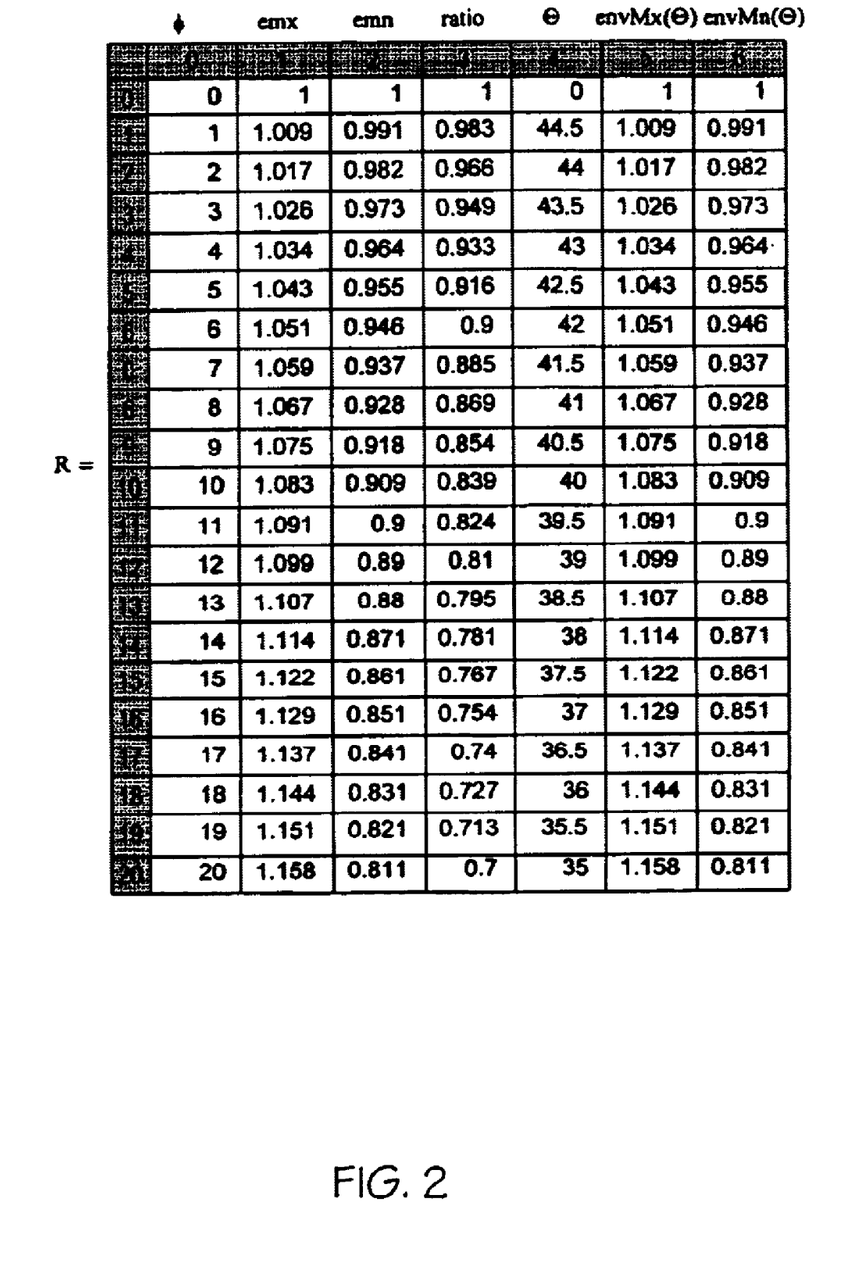
FIG. 2 depicts an exemplary table of values for comparison.

The x and y coordinates of the maximum envelope at $\Theta$ may be determined by:

$X_{n1} := a \cdot \cos(\Theta_{n1})$ $Y_{n1} := b \cdot \sin(\Theta_{n1} + \phi n1)$ The x and y coordinates of the minimum envelope at $\Theta$ may be determined by:

$Xmn_{n1} := a \cdot \cos\left(\Theta_{n1} + \frac{\pi}{2}\right)$ $Ymn_{n1} := b \cdot \sin\left(\Theta_{n1} + \frac{\pi}{2} + \phi_{n1}\right)$ The maximum envelope (envMx) and minimum envelope (envMn) may be computed by:

$envMx_{n1} := \sqrt{(X_{n1})^2 + (Y_{n1})^2}$ $envMn_{n1} := \sqrt{(Xmn_{n1})^2 + (Ymn_{n1})^2}$ The maximum and minimum envelope values so computed (envMx and envMn) may be compared with the minimum and maximum envelope values computed previously (emx and emn). Referring to FIG. 2, an exemplary table showing a comparison of the separate values for the minimum and maximum envelope values is shown. The values computed in the exemplary table may be calculated as follows:

$R_{n1,0} := \phi_{n1} \cdot \zeta$ $R_{n1,1} := emx_{n1}$ $R_{n1,2} := emx_{n1}$ $R_{n1,3} := er_{nx_{n1}}$ $R_{n1,4} := \Theta_{n1} \cdot \zeta$ $R_{n1,5} := envMx_{n1}$ $R_{n1,6} := envMn_{n1}$ The values computed for envMx and envMn are the same as the values for emx and emn, showing that the equation for $\Theta$ is correct.

In order to estimate a phase error from a minimum to maximum envelope ratio, a relationship between the ratio and phase error may be computed. Utilizing a curve fitting technique, data may be fit into a straight line and more preferably, a quadratic equation.

Beginning with a straight line curve-fitting technique utilizing the $R_{n1,3}$ values from FIG. 2, a rise per degree of run, slope of ratio vs. phase error in degrees may be shown by:

$$mrd := \frac{er_{nx_{\phi max}} - er_{nx_0}}{\phi max}$$

$mrd = -0.014989570215612$

The straight line fit of ratio may be shown by:

intcept=0.9945

$er_{est_{n1}} := mrd \cdot \phi_{n1} \cdot \zeta + intcept$

The above equation may be used by solving it for $\phi$ and substituting the computed ratio value from the measured minimum and maximum values of the envelope (emx and emn). The resulting $\phi$ is then the phase error estimate, $\phi_{est}$.

$\phi est = (er_{est} - intcept) \cdot mrd^{-1}$

Figure 3:
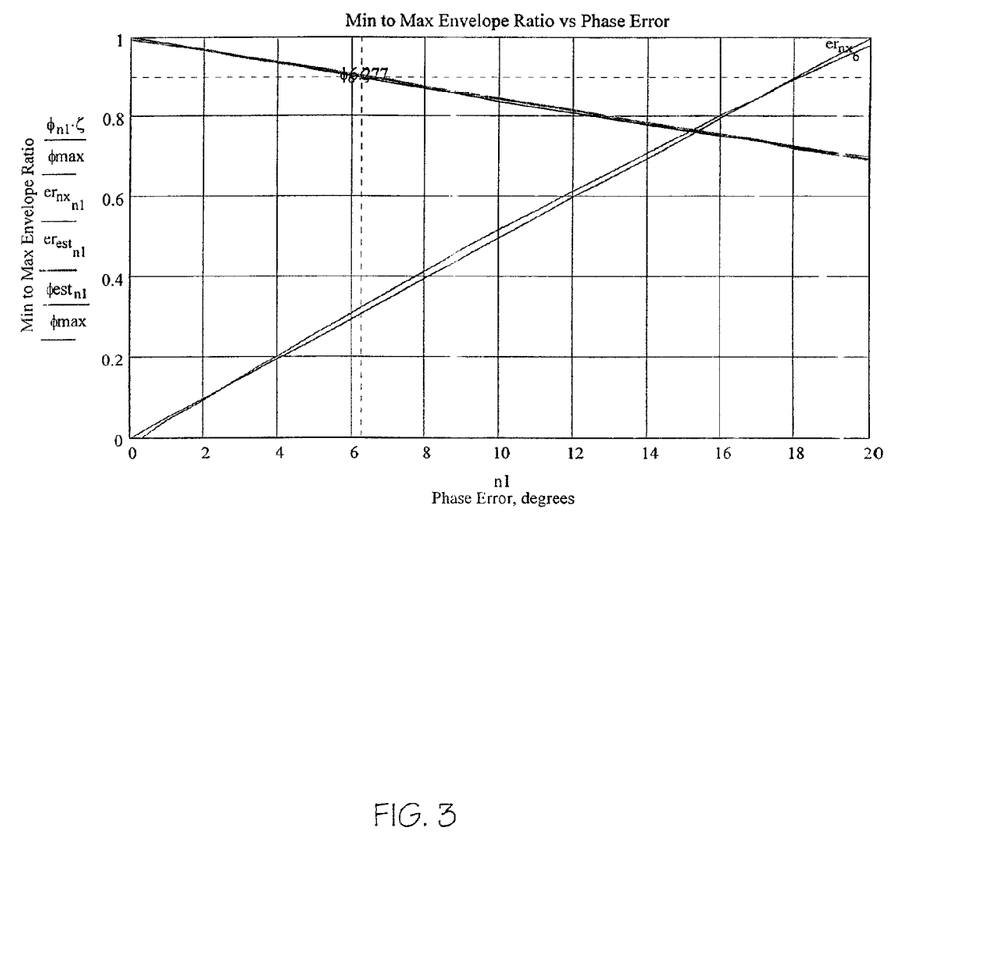
FIG. 3 depicts an exemplary graph for determining the phase error based upon a given minimum to maximum envelope ratio.

The phase error may be computed in terms of the computed minimum to maximum envelope ratio. The computed minimum to maximum values with the related ones in the table as shown in FIG. 2 along with the exemplary plot as shown in FIG. 3 may show the error in the estimate. For plotting purposes the computed envelope ratios may be used as measured values.

$$\phi est_{n1} := \frac{er_{nx_{n1}} - intcept}{mrd}$$

Rise per radian of run, slope of ratio vs. phase error in radians:

$$mr := \frac{er_{nx\phi max} - er_{nx_0}}{\phi max \cdot \zeta^{-1}}$$

mr=-b 0.858839110069583

$$\phi est_{n1} := \frac{er_{nx_{n1}} - intcept}{mr} \cdot \zeta$$

Hence, in one iteration, the phase estimate may be corrected to about −50 db using simple straight-line curve-fitting. This has been done above by changing the y intercept so as to allow bipolar error where the zero error point may be obtained somewhere between the endpoints of the curve instead of exactly at the endpoints. Distortion may be expected to vary from −50 db to −70 db with one iteration of this technique as the phase error varies from a magnitude of 0° up to 20°. Since residual gain and direct current offset errors may degrade the phase estimate, it is presently preferred to limit the estimates in practice to remain on the fitted curve. Again, a quadratic equation may provide a better fit and may provide better distortion characteristics. As shown next, the improvement in performance may be more than 20 db using a quadratic equation.

Let the x-axis data be:

$xx := \phi \cdot \zeta$

Fit to the y data:

$$G(z, B) \equiv \begin{pmatrix} B_0 + B_1 \cdot z + B_2 \cdot z^2 \\ 1 \\ z \\ z^2 \end{pmatrix}$$

$$vg2 := \begin{pmatrix} 1 \\ 1 \\ 1 \end{pmatrix}$$

$B := genfit(xx, er_{nx}, vg2, G)$

| T $\phi est =$ | 0 | 1 | 2 | 3 | 4 | 5 | 6 | 7 | 8 | 9 | 10 | 11 |
|---|---|---|---|---|---|---|---|---|---|---|---|---|
| 0 | −0.367 | 0.787 | 1.922 | 3.038 | 4.135 | 5.215 | 6.277 | 7.323 | 8.353 | 9.368 | 10.367 | 11.352 |

The equation for $\phi_{est}$ can be used as described above to estimate the phase error from a measured and computed ratio, or else the plot below can be used as follows. Draw a horizontal line at the computed ratio and find its intersection with the line used to fit the data. Then read the phase error value at that intersection from the abscissa. Referring to FIG. 3, if ratio=0.9, the x coordinate at the intersection with the line for $er_{est}$ is 6.277 where 6 is the exact answer.

Assuming perfect gain and direct current offset correction so that only residual phase error remains and assuming straight-line curve-fitting the distortion caused by residual phase error can be computed using equation 8.40 from:

Rockwell Corporation, Collins Division, *Single Sideband Systems and Circuits* 2$^{nd}$ ed. (McGraw-Hill, Inc. 1995)

$dist1_{n1} := (1+1-2 \cdot \cos(\phi est_{n1} \cdot \zeta^{-1} - \phi_{n1})) \cdot (1+1+2 \cdot \cos(\phi est_{n1} \cdot \zeta^{-1} - \phi_{n1}))$ $stLineDistDb_{n1} := if(dist1_{n1} = 0, -65, 10 \cdot \log(dist1_{n1}))$ max($stLineDistDb$)=49.875

$$B = \begin{pmatrix} 0.999573323 \\ -0.017148083 \\ 1.099644565 \times 10^{-4} \end{pmatrix}$$

$g1_{n1} := B_0 + B_1 \cdot xx_{n1} + B_2 \cdot (xx_{n1})^2$ $$x_{est_{n1}} := \frac{1}{(2 \cdot B_2)} \cdot \left[ -B_1 - [(B_1)^2 + 4 \cdot B_2 \cdot er_{nx_{n1}} - 4 \cdot B_2 \cdot B_0]^{(\frac{1}{2})} \right]$$

$dist2_{n1} := (1+1-2 \cdot \cos(x_{est_{n1}} \cdot \zeta^{-1} - \phi_{n1})) \cdot (1+1+2 \cdot \cos(x_{est_{n1}} \cdot \zeta^{-1} - \phi_{n1}))^{-1}$ $quadDistDb_{n1} := if(dist2_{n1} = 0, -65, 10 \cdot \log(dist2_{n1}))$ max($quadDistDb$)=−71.495

Figure 4:
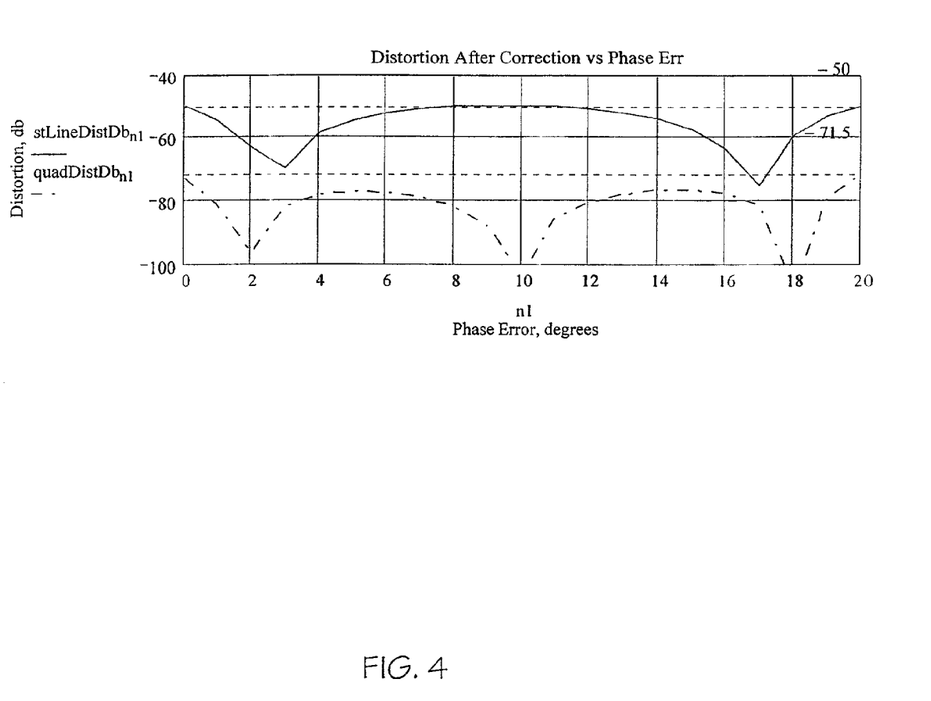
FIG. 4 depicts an embodiment of the distortion after correction utilizing a straight line method and a quadratic equation.

Referring to FIG. 4, an exemplary graph describing the distortion after correction versus the phase error is shown. As shown in FIG. 4, utilization of the quadratic equation of the present invention provides more accurate results.

An alternate method of estimating the phase error in a signal from an analog transmitter in accordance with the present invention is a maximum abscissa method. Transmitter and receiver waveforms are elliptically distorted by phase and gain errors. The line drawn from the origin subtending angle φ (phase error) with the x-axis may intersect the distorted waveform at or near the extreme x value for phase errors less than or equal to 20°. The phase angle, φ, at which the intersection may occur is derived by setting v=w (see equations below) where x=u at the point of intersection on the ellipse and solving for φ.

Assuming direct current offset correction has already occurred this technique may use the point of tangency of a vertical line at x=max(I) to give the I and Q coordinates that approximate the phase error (atan[Q/I]) for errors of magnitude less than or equal to 20°. Sequential iterations converge on the actual phase error. This technique may have the advantage of being quick as the maximum x value may be found and the angle subtended by a line from the origin to this point on the waveform may be determined. The disadvantage is that it is only useful for small angles less than about 20°.

Figure 5:
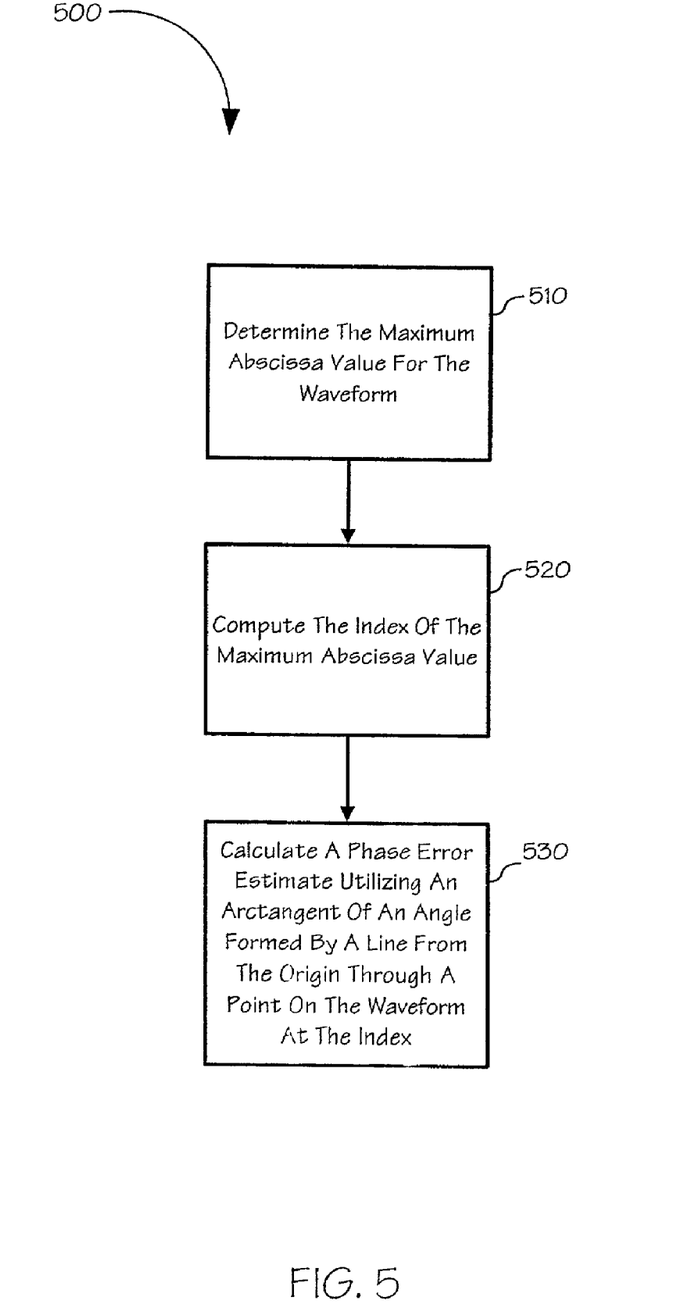
FIG. 5 depicts an embodiment of a flow diagram for estimating phase error in a waveform by the maximum abscissa technique of the present invention.

Referring now to FIG. 5, an embodiment 500 of the maximum abscissa technique for estimating phase error is shown. The technique may begin by determining the maximum abscissa value for the waveform 510. The index of the maximum abscissa value may then be computed 520. Once the index has been computed, the phase error may be estimated by finding the arctangent of an angle formed by a line from the origin through a point on the waveform at the index 530.

A simulation describing the process may begin by selecting a phase error in degrees ($\zeta^{-1}$ converts it to radians):

$\phi := 10 \cdot \zeta^{-1}$

N data points may be created for study:

N:=1000 n:=0.. N−1

An angle increment may be created by:

$$\Delta := \frac{360}{N} \cdot \frac{\pi}{180}$$

$\theta_n := n \cdot \Delta$

The angle increment may be converted from radians to degrees by:

$\zeta := 180 \cdot \pi^{-1}$

The semi major and minor ellipse axes and direct current offsets may be created by:

a:=1 b:=1 h:=0 k:=0

Figure 6:
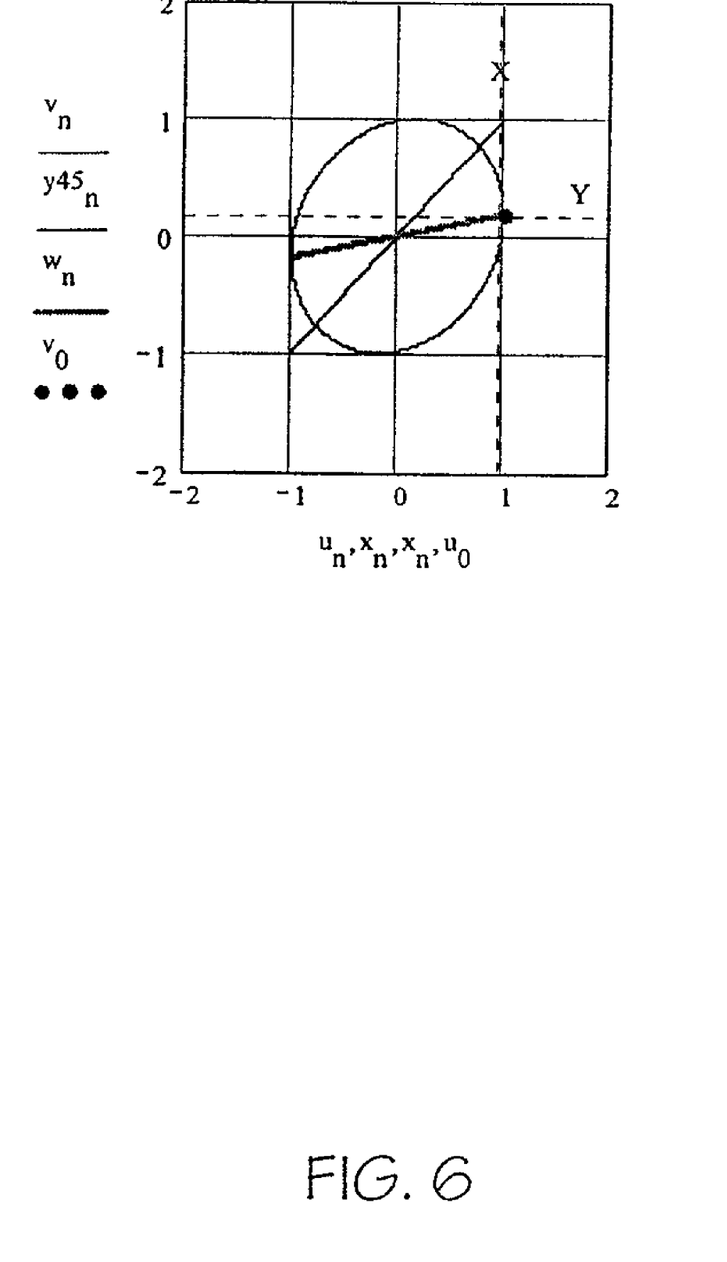
FIG. 6 depicts an exemplary graph for determining the phase error via the maximum abscissa technique of the present invention.

An x-axis variable may be created by:

$x_{mn} := -a + h$ $x_{mx} := a + h$ $\delta_x := 2 \cdot a \cdot N^{-1}$ $x_n := x_{mn} + n \cdot \delta_x$ A reference line at a 45° angle may be created for plots below by:

$y45_n := x_n$

A line from the origin at angle, φ, and slope tan(φ) may be created by:

$w_n := \tan(\phi) \cdot x$

The x (or I) component of distorted waveform may be computed by:

$u_n := a \cdot \cos(\theta_n) + h$

The y (or Q) component of distorted waveform may be computed by:

$v_n := b \cdot \sin(\theta_n, \phi) + k$

Θ, the angle Θ in degrees where v=w and the line w may intersects the ellipse waveform may be shown by:

$$\Theta := \operatorname{atan}\left(\frac{a}{b} \cdot \frac{\tan(\phi)}{\cos(\phi)} - \tan(\phi)\right) \cdot \zeta$$

The X and Y coordinates at intersection may be given by:

$X := a \cdot \cos(\Theta \cdot \zeta^{-1})$ $Y := b \cdot \sin(\Theta \cdot \zeta^{-1} + \phi)$ X may be on the line w if Y and Z are the same:

$Z := \tan(\phi) \cdot X$ which may show that w=v at Θ as desired.

Y−Z=0

The maximum abscissa value may be found by:

ux:=max(u)

ux=1

The index of the maximum abscissa value may be found by:

$undxv_n := \operatorname{if}(u_n = ux, n, -1)$ undx:=max(undxv)

undx=0

The phase estimate may be made based on the arctangent of the angle formed by a line from the origin through the point on the waveform at index undx.

$$\phi_{est} := \operatorname{atan}\left(\frac{v_{undx}}{u_{undx}}\right)$$

$\phi_{est} \cdot \zeta = 9.85107611658391$

While assuming perfect gain and direct current offset correction so that only residual phase error remains, the distortion caused by residual phase error can be computed using equation 8.40 from:

Rockwell Corporation, Collins Division, *Single Sideband Systems and Circuits* $2^{nd}$ ed. (McGraw-Hill, Inc. 1995)

$dist := (1+1-2 \cdot \cos(\phi_{est}-\phi)) \cdot (1+1+2 \cdot \cos(\phi_{est}-\phi))^{-1}$ $distDb = 10 \cdot \log(dist)$ $distDb = -57.724$ Hence, in one iteration, the phase estimate for a phase error of 10° as in the above example may be estimated to approximately −58 db total distortion. Distortion may be expected to vary from −40 db to −117 db with one iteration of the maximum abscissa technique as the phase error varies from a magnitude of 20° down to 1°. Further iterations may improve the estimate, however, the error in the estimate could also be characterized by lookup table or the data may be fit to a quadratic equation that could be used to correct the estimate. Residual gain and direct current offset errors degrade the phase estimate which may be computed utilizing the maximum abscissa technique.

Another technique for estimating phase error inherent in a waveform sent from an analog transmitter may be the half angle by intersection using envelope error technique of the present invention. Utilizing an envelope error may allow computing a phase error estimate, $\phi_{est}$, as twice the angle subtended by a line from the origin to the point of intersection of the received envelope with a circle of magnitude 1. The interpolation term may be added or subtracted depending upon the direction of rotation and the quadrant of the intersection. An advantage of the half angle technique lies in the accuracy of the estimated phase error. Another advantage of the half angle technique may be in the computation of an accurate estimated phase error even with direct current offset in the y or Q channel.

Figure 7:
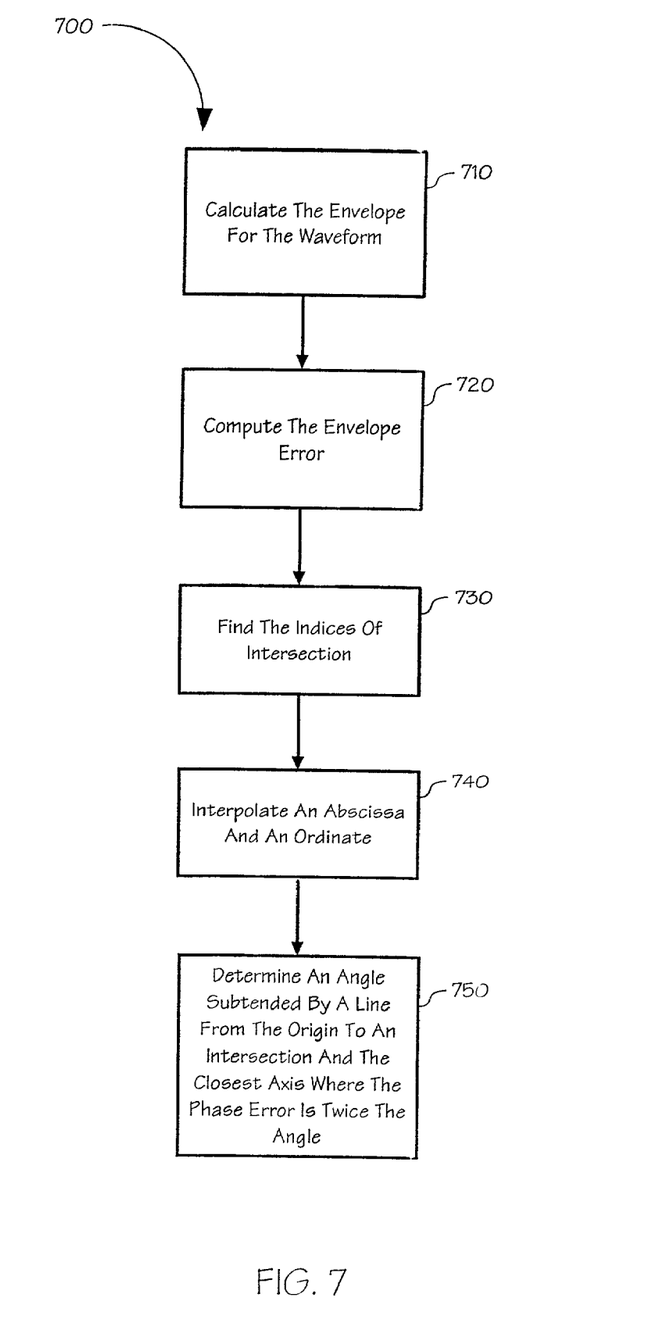
FIG. 7 depicts an embodiment of a flow diagram for estimating phase error in a waveform by the half angle technique of the present invention.

Referring now to FIG. 7, an embodiment 700 of half angle by intersection technique for estimating phase error inherent in a waveform is shown. The technique may begin by calculating the envelope for the waveform 710. The envelope error may be computed 720 and the indices of intersection may be found 730. Utilizing the indices of intersection and envelope error at sampling points on envelope on either side, an interpolation of an abscissa and an ordinate may be performed 740. The angle subtended by a line from the origin to an intersection and the closest axis may be determined where the phase error is twice the angle formed 750.

A simulation describing the half angle technique may begin by selecting N data points for study:

$N := 1000$ $n := 0 .. N-1$

An angle increment may be created by:

$$\Delta := \frac{360}{N} \cdot \frac{\pi}{180}$$

$\theta_n := n \cdot \Delta$

The angle may be converted from radians to degrees by:

$\zeta := 180 \cdot \pi^{-1}$

The semi major and minor ellipse axes and direct current offsets may be shown by:

$a := 1$ $b := 1$ $h := 0$ $k := 0$

An x-axis variable may be created by:

$x_{mn} := -a + h$ $x_{mx} := a + h$ $\delta_x := 2 \cdot a \cdot N^{-1}$ $x_n := x_{mn} + n \cdot \delta_x$ A phase error in degrees may be selected, in this simulation 100 is selected ($\zeta^{-1}$ converts it to radians):

$\phi := 10 \cdot \zeta^{-1}$

The x (or I) component of distorted waveform may be computed by:

$u_n := a \cdot \cos(\theta_n) + h$

The y (or Q) component of distorted waveform may be computed by:

$v_n := b \cdot \sin(\zeta_n + \phi) + k$

The envelope of u and v may be created by:

$$en_n := \sqrt{(u_n)^2 + (v_n)^2}$$

The undistorted envelope would have a value of 1.0. The envelope error may be computed by:

$e_{n_n} := en_n - 1$

The indices of intersection may be found by:

$$\text{index} := \begin{vmatrix} i \leftarrow 0 \\ \text{flag} \leftarrow 1 \\ ex \leftarrow 0 \\ \text{for } v \in 0 \ldots N-1 \\ \quad \text{if } [(v \geq 1) \cdot (e_{e_v} \cdot e_{e_{v-1}} < 0)] \\ \quad \quad \begin{vmatrix} ex_i \leftarrow v \\ i \leftarrow i+1 \\ \text{flag} \leftarrow 0 \end{vmatrix} \\ ex \end{vmatrix}$$

$$\text{index} = \begin{bmatrix} 237 \\ 487 \\ 737 \\ 987 \end{bmatrix}$$

$n2 := 0 \ldots \text{last(index)}$

Figure 8:
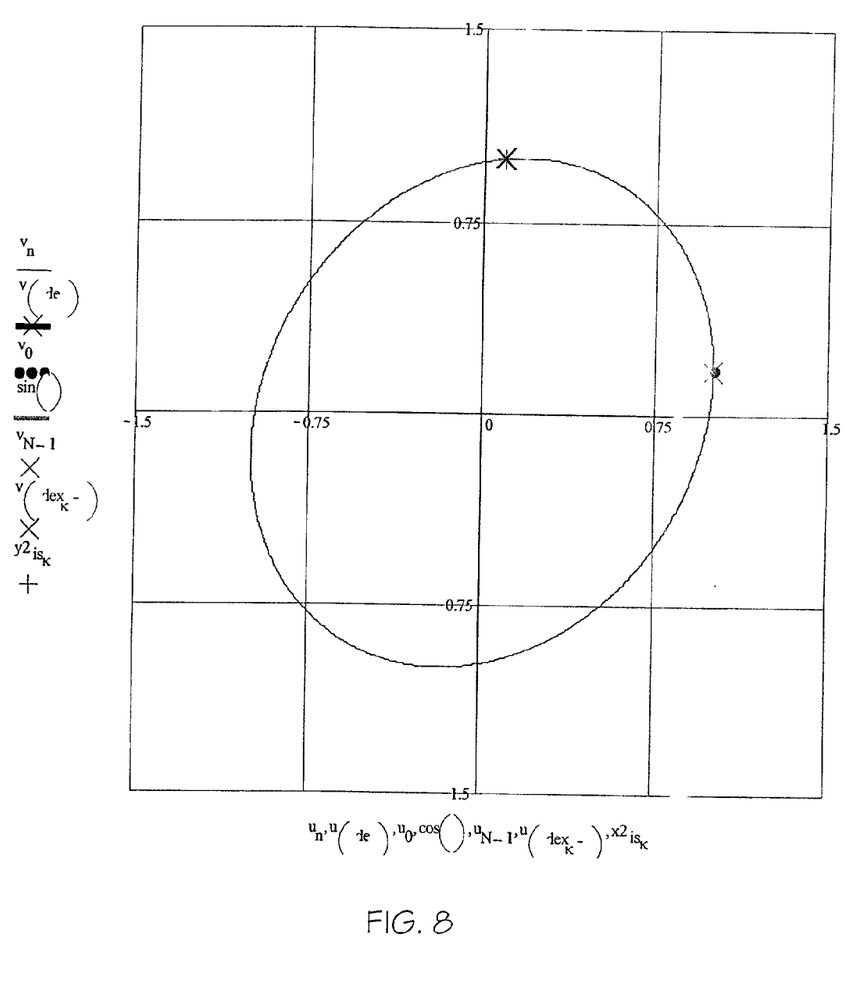
FIG. 8 depicts an exemplary graph for determining the phase error via the half angle technique of the present invention.

Using the indices of intersection and envelope error at sampling points on the envelope on either side of intersection to improve estimate via interpolation gives accurate estimates for angles from −90° to +90°. The quadrant and rotation may be solved by adding if envelope error goes from positive to negative across the intersection, while subtracting if the envelope error goes from negative to positive across the intersection. The half angle technique may not produce an accurate phase error estimation with direct current offset in both channels in current form, but the output of the half angle technique could be ignored until most or all of direct current errors have been removed. If direct current offset exists in only one channel, then averaging all the $\phi_{est}$ may provide accurate results as before without averaging and without direct current offset. The total change in envelope error between the two samples straddling the intersection of the distorted waveform with the reference may be computed by:

$$\Delta_{n2} := |e_e(\text{index}_{n2})| + |e_e(\text{index}_{n2-1})|$$

The change in abscissa between the two samples may be computed by:

$$\delta x_{n2} := u_{(\text{index}_{n2})} - u_{(\text{index}_{n2-1})}$$

The change in ordinate between the two samples may be computed by:

$$\delta y_{n2} := v_{(\text{index}_{n2})} - v_{(\text{index}_{n2-1})}$$

The abscissa may be interpolated just before the intersection to provide an accurate coordinate at the intersection:

$$x2_{is} := \begin{vmatrix} \text{for } k \in 0 \ldots \text{last (index)} \\ \quad \begin{vmatrix} x3_k \leftarrow u_{(\text{index}_k-1)} + \frac{e_{e(\text{index}_k-1)}}{\Delta_k} \cdot \delta x_k & \text{if } [e_{e(\text{index}_k)} < 0] \\ x3_k \leftarrow u_{(\text{index}_k-1)} + \frac{e_{e(\text{index}_k-1)}}{\Delta_k} \cdot \delta x_k & \text{otherwise} \end{vmatrix} \\ x3 \end{vmatrix}$$

The ordinate may be interpolated just before the intersection to provide an accurate coordinate at the intersection:

$$y2_{is} := \begin{vmatrix} \text{for } k \in 0 \ldots \text{last (index)} \\ \quad \begin{vmatrix} y3_k \leftarrow v_{(\text{index}_k-1)} + \frac{e_{e(\text{index}_k-1)}}{\Delta_k} \cdot \delta y_k & \text{if } [e_{e(\text{index}_k)} < 0] \\ y3_k \leftarrow v_{(\text{index}_k-1)} + \frac{e_{e(\text{index}_k-1)}}{\Delta_k} \cdot \delta y_k & \text{otherwise} \end{vmatrix} \\ y3 \end{vmatrix}$$

The angle of line from the origin to the point of intersection may be computed by:

$$\phi 2_{e_{n2}} := \text{atan}\left(\frac{y2\text{is}_{n2}}{x2\text{is}_{n2}}\right)$$

The phase estimate may be twice the angle subtended by a line from the origin to the intersection and the closest axis as shown by:

$$\phi 2_{est} := \begin{vmatrix} \text{for } k \in 0 \ldots \text{last(index)} \\ \quad \begin{vmatrix} \phi 3_k \leftarrow 2 \cdot (0.5 \cdot \pi - \phi 2_{e_k}) & \text{if}[(\phi 2_{e_k} > 0) \cdot (|y2_{is_k}| > x2_{is_k}|)] \\ \phi 3_k \leftarrow 2 \cdot (-0.5 \cdot \pi - \phi 2_{e_k}) & \text{if}[(\phi 2_{e_k} < 0) \cdot (|y2_{is_k}| > |x2_{is_k}|)] \\ \phi 3_k \leftarrow \phi 2_{e_k} \cdot 2 & \text{otherwise} \end{vmatrix} \\ \phi 3 \end{vmatrix}$$

All of the estimates may be averaged to provide a correct result if there is direct current offset on only one channel:

$$\text{avg}\_\phi 2_{est} := \zeta \cdot (\text{last(index)} + 1)^{-1} \cdot \left(\sum_{n2} \phi 2_{est_{n2}}\right)$$

$\text{avg}\_\phi 2_{est} = 10.0000382038299$

By assuming perfect gain and direct current offset correction so that only residual phase error remains the distortion caused by residual phase error may be computed using equation 8.40 from:

Rockwell Corporation, Collins Division, *Single Sideband Systems and Circuits* $2^{nd}$ ed. (McGraw-Hill, Inc. 1995)

$\text{dist} := (1 + 1 - 2 \cdot \cos(\text{avg}\_\phi 2_{est} \cdot \zeta^{-1} - \phi)) \cdot (1 + 1 + 2 \cdot \cos(\text{avg}\_2_{est} \cdot \zeta^{-1} - \phi))^{-1}$ $\text{distDb} := 10 \cdot \log(\text{dist})$ $\text{distDb} = -129.542$ Hence, in one iteration, the phase estimate for a phase error of 10° as in the above example may be accurate to −130 db total distortion. Distortion may be expected to vary from −110 db to −135 db with one iteration of this algorithm as the phase error varies from a magnitude of 20° down to 1°. Residual gain and direct current offset errors may degrade the phase estimate as computed by the half angle technique unless, as stated, there is direct current in only one channel (y or Q axis). However, the half angle technique may still be used if there is direct current in the x axis by shifting the origin by the amount of the offset in the x direction.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A method to obtain clear reception of a signal with phase errors, comprising:
   receiving a waveform sent from an analog transmitter;
   estimating a phase error present in said waveform; and
   compensating for said phase error; wherein said phase error is estimated via a minimum to maximum envelope ratio technique, wherein said minimum to maximum envelope technique comprises:
      determining a minimum envelope value of said waveform;
      determining a maximum envelope value of said waveform;
      calculating a ratio of the minimum envelope value to the maximum envelope value; and
      converting said ratio to a phase error estimate utilizing a curve fitting technique.

2. The method as claimed in claim 1, wherein said curve fitting technique is at least one of a straight line fit and quadratic equation.

3. The method as claimed in claim 1, wherein said curve fitting technique is accomplished using a look-up table.

4. The method as claimed in claim 1, wherein said phase error estimate is computed without quadrature components.

5. A method to obtain clear reception of a signal with phase errors, comprising:
   receiving a waveform;
   estimating a phase error present in said waveform; and
   compensating for said phase error, wherein said phase error estimate is estimated via a maximum abscissa technique, said maximum abscissa technique comprising:
      determining a maximum abscissa value of said waveform,
      finding an index of said maximum abscissa value; and
      calculating a phase error estimate utilizing an arctangent of an angle formed by a line from an origin through a point on said waveform at said index, said angle being equal to said phase error estimate.

6. The method as claimed in claim 5, further including performing multiple iterations of said maximum abscissa technique to thereby reduce distortion.

7. The method as claimed in claim 5, wherein data produced utilizing said maximum abscissa technique is fit into a quadratic equation suitable for creating a more accurate phase error estimate.

8. A method to obtain clear reception of a signal with phase errors, comprising:
   receiving a waveform;
   estimating a phase error present in said waveform; and
   compensating for said phase error, wherein said phase error estimate is estimated via a half angle technique, said half angle technique comprising:
      calculating an envelope of said waveform;
      computing an envelope error;
      finding indices of intersection;
      interpolating an abscissa and an ordinate; and
      determining an angle subtended by a line from an origin to an intersection and the closest axis, wherein a phase error estimate is twice said angle.

9. The method as claimed in clam 8, wherein said half angle technique produces an accurate phase error estimate with direct current offset in a quadrature channel.

10. A method for estimating phase errors present in a signal, comprising:
    receiving a waveform sent from an analog transmitter; and
    estimating a phase error present in said waveform using a minimum to maximum envelope ratio technique, said minimum to maximum envelope technique comprises:
       determining a minimum envelope value of said waveform;
       determining a maximum envelope value of said waveform;
       calculating a ratio of the minimum envelope value to the maximum envelope value; and
       converting said ratio to a phase error estimate utilizing a curve fitting technique.

11. The method as claimed in claim 10 wherein said curve fitting technique is at least one of a straight line fit and quadratic equation.

12. The method as claimed in claim 10 wherein said phase error estimate is computed without quadrature components.

13. A method for estimating phase errors present in a signal, comprising:
    receiving a waveform; and
    estimating a phase error present in said waveform, wherein said phase error estimate is estimated via a maximum abscissa technique, said maximum abscissa technique comprising:
       determining a maximum abscissa value of said waveform;
       finding an index of said maximum abscissa value; and
       calculating a phase error estimate utilizing an arctangent of an angle formed by a line from an origin through a point on said waveform at said index, said angle being equal to said phase error estimate.

14. The method as claimed in claim 13, further including performing multiple iterations of said maximum abscissa technique to thereby reduce distortion.

15. The method as claimed in claim 13, wherein data produced utilizing said maximum abscissa technique is fit into a quadratic equation suitable for creating a more accurate phase error estimate.

16. A method for estimating phase errors present in a signal, comprising:
    receiving a waveform; and
    estimating a phase error present in said waveform, wherein said phase error estimate is estimated via a half angle technique, said half angle technique comprising:
       calculating an envelope of said waveform;
       computing an envelope error;
       finding indices of intersection;
       interpolating an abscissa and an ordinate; and
       deter an angle subtended by a line from an origin to an intersection and the closest axis, wherein a phase error estimate is twice said angle.

17. The method as claimed in claim 16, wherein said half angle technique produces an accurate phase error estimate with direct current offset in a quadrature channel.

* * * * *